(12) United States Patent
Williams

(10) Patent No.: US 11,619,063 B1
(45) Date of Patent: Apr. 4, 2023

(54) POLE STAND

(71) Applicant: Walter Williams, Los Angeles, CA (US)

(72) Inventor: Walter Williams, Los Angeles, CA (US)

(*) Notice: Subject to any disclaimer, the term of this patent is extended or adjusted under 35 U.S.C. 154(b) by 0 days.

(21) Appl. No.: 17/587,837

(22) Filed: Jan. 28, 2022

(51) Int. Cl.
*E04H 12/22* (2006.01)

(52) U.S. Cl.
CPC ..... *E04H 12/2238* (2013.01); *E04H 12/2215* (2013.01); *E04H 12/2269* (2013.01); *F16M 2200/00* (2013.01); *F16M 2200/08* (2013.01)

(58) Field of Classification Search
CPC ............ E04H 12/2215; E04H 12/2269; E04H 12/223; E04H 12/2238; E04H 12/2261; F16M 11/00; F16M 2200/00; F16M 2200/08; A45B 2023/0012; A45B 23/00; E02D 5/80; A45F 3/44
USPC .......................................................... 248/519
See application file for complete search history.

(56) References Cited

U.S. PATENT DOCUMENTS

| | | | | |
|---|---|---|---|---|
| 187,337 A * | 2/1877 | Wing et al. | ......... | E04H 12/2215 52/156 |
| 798,945 A * | 9/1905 | Berntson | ............. | E04H 12/2215 52/154 |
| 1,218,357 A * | 3/1917 | Bauer | ...................... | A47B 3/12 248/156 |
| 1,402,561 A * | 1/1922 | Banks | ................. | E04H 12/2215 52/156 |
| 1,933,282 A * | 10/1933 | Schram | ............... | E04H 12/2215 52/158 |
| 2,870,884 A * | 1/1959 | Mazur | ....................... | E02D 5/80 52/158 |
| 2,883,247 A * | 4/1959 | Thompson | .......... | E04H 12/2238 D3/10 |
| 3,032,149 A * | 5/1962 | Manghise | ........... | E04H 12/2215 52/156 |
| 3,225,656 A | 12/1965 | Flaherty et al. | | |
| 3,519,234 A * | 7/1970 | Matson | ............... | E04H 12/2215 144/195.5 |
| 3,724,145 A * | 4/1973 | Daniel | .................... | E02D 5/801 52/165 |
| 3,824,748 A * | 7/1974 | Pichowicz | ............ | E04H 12/223 52/103 |

(Continued)

FOREIGN PATENT DOCUMENTS

| | | | | |
|---|---|---|---|---|
| CN | 112983099 A * | 6/2021 | ......... | E04H 12/2215 |
| DE | 20000785 U1 * | 3/2000 | ......... | E04H 12/2215 |

(Continued)

*Primary Examiner* — Muhammad Ijaz
*Assistant Examiner* — Taylor Morris
(74) *Attorney, Agent, or Firm* — Cislo & Thomas, LLP

(57) ABSTRACT

A pole stand having a base, a holder removably attachable to the base, and a plurality of stakes to secure the base to the ground. A top surface of the base has a section to store the holder when not in use. A bottom surface of the base has a plurality of stake holders to hold the stakes when not in use. The holder has two tubes attached by link arms to allow the two holders to be adjustable relative to each other. The base also has a central main hole and a plurality of auxiliary holes so that a pole can be inserted through at least one of the tubes and through the main hole so as to be perpendicular to the ground, or through one of the auxiliary holes so as to be non-perpendicular to the ground.

7 Claims, 8 Drawing Sheets

(56) References Cited

U.S. PATENT DOCUMENTS

| | | | | |
|---|---|---|---|---|
| 3,840,203 A | * | 10/1974 | Sheehy | F16M 7/00 |
| | | | | 248/156 |
| 4,004,383 A | * | 1/1977 | Watanabe | E04H 12/2215 |
| | | | | 52/165 |
| 4,296,693 A | | 10/1981 | Archer | |
| 4,342,179 A | * | 8/1982 | Hill | E02D 5/80 |
| | | | | 52/155 |
| 4,452,018 A | * | 6/1984 | Hill | E02D 5/80 |
| | | | | 52/155 |
| D285,883 S | | 9/1986 | Tegze | |
| 4,649,678 A | * | 3/1987 | Lamson | E01F 9/677 |
| | | | | 52/165 |
| 4,738,060 A | * | 4/1988 | Marthaler | E04H 12/223 |
| | | | | 52/153 |
| 4,753,411 A | | 6/1988 | Lechner et al. | |
| 4,850,564 A | * | 7/1989 | Padin | E04H 12/2223 |
| | | | | 248/533 |
| 4,926,785 A | * | 5/1990 | Lamson | E04H 12/2215 |
| | | | | 52/165 |
| 5,207,406 A | | 5/1993 | Stine et al. | |
| 5,354,031 A | | 10/1994 | Bilotti | |
| 5,377,976 A | * | 1/1995 | Matherne | A63B 63/083 |
| | | | | 473/483 |
| D364,048 S | | 11/1995 | Winslow, Sr. | |
| 5,497,972 A | * | 3/1996 | Sofy | A47F 5/04 |
| | | | | 248/523 |
| 5,586,742 A | * | 12/1996 | Carter | F21V 21/0824 |
| | | | | 52/156 |
| 5,711,331 A | | 1/1998 | Harris | |
| 6,088,946 A | | 7/2000 | Simmons | |
| 6,305,659 B1 | | 10/2001 | Metelski | |
| 6,412,747 B2 | | 7/2002 | Davis et al. | |
| D470,305 S | | 2/2003 | Clarke | |
| 6,523,808 B1 | * | 2/2003 | Lehmann | E04H 12/2269 |
| | | | | 256/65.01 |
| 6,612,320 B2 | * | 9/2003 | Lin | A45B 25/22 |
| | | | | 135/33.7 |
| D481,562 S | | 11/2003 | Shilling et al. | |
| 6,888,512 B1 | | 5/2005 | Daigler | |
| 6,938,871 B1 | | 9/2005 | Carlson | |
| 6,953,180 B1 | | 10/2005 | Ruvalcaba et al. | |
| 7,360,561 B2 | | 4/2008 | Dohler | |
| 7,793,910 B2 | | 9/2010 | Salman | |
| 8,308,123 B1 | * | 11/2012 | Accordino | A45C 13/40 |
| | | | | 248/220.21 |
| 8,561,361 B2 | * | 10/2013 | Bauletti | E04H 12/2215 |
| | | | | 52/158 |
| 9,115,507 B2 | * | 8/2015 | Wyrostek | E04H 12/2292 |
| 9,249,596 B2 | * | 2/2016 | Williams | E04H 12/2238 |
| 9,464,397 B1 | * | 10/2016 | Abraham | E02D 5/801 |
| 9,493,962 B2 | * | 11/2016 | Eddy | E04H 12/2261 |
| 9,683,384 B2 | * | 6/2017 | Gerrard | E01F 13/026 |
| 9,850,638 B2 | * | 12/2017 | Despotellis | E02D 27/42 |
| 9,890,551 B1 | * | 2/2018 | Delao | E04H 15/62 |
| 10,329,791 B1 | * | 6/2019 | Cauley, Jr. | E02D 5/80 |
| 10,344,496 B1 | * | 7/2019 | Cefalo | E04H 12/2215 |
| 2003/0094559 A1 | | 5/2003 | Krinner | |
| 2005/0000170 A1 | * | 1/2005 | DiDomenico | E02D 5/80 |
| | | | | 52/169.9 |
| 2006/0006306 A1 | | 1/2006 | Wadsworth | |
| 2008/0017226 A1 | | 1/2008 | Nobert et al. | |
| 2008/0029137 A1 | * | 2/2008 | McInville | E04H 12/2269 |
| | | | | 248/539 |
| 2008/0230674 A1 | * | 9/2008 | Schroeder | E04H 12/2292 |
| | | | | 248/545 |
| 2011/0180679 A1 | | 7/2011 | Ma | |
| 2017/0233972 A1 | * | 8/2017 | Zhou | E02D 5/80 |
| | | | | 52/155 |
| 2018/0168125 A1 | * | 6/2018 | Johnson | E04H 12/2238 |
| 2019/0234097 A1 | * | 8/2019 | Carless | E04H 12/223 |
| 2020/0087946 A1 | * | 3/2020 | Wehr | E04H 12/22 |
| 2021/0198916 A1 | * | 7/2021 | Aronow | E04H 12/223 |
| 2021/0324653 A1 | * | 10/2021 | Narvaez-Newman | E04H 12/223 |

FOREIGN PATENT DOCUMENTS

| | | | |
|---|---|---|---|
| DE | 102009037756 A1 * | 2/2011 | E04H 12/2215 |
| WO | WO-2006047895 A1 * | 5/2006 | E04H 12/223 |

* cited by examiner

POLE STAND

TECHNICAL FIELD

This invention relates to a stand to hold poles, such as that for beach umbrellas and the like.

BACKGROUND

Going to the beach or playing at the park is a cost-effective way to spend time with the family or enjoy a relaxing day. Unfortunately, the beaches and sometimes the parks lack sufficient shading to avoid sunburns caused by the sun. Many people bring beach umbrellas. However, the beach umbrellas are difficult to drive into the sand or grass to provide sufficient support to keep the beach umbrella upright. The sand may be too soft to keep the umbrella standing. The grass may be too tough to drive the umbrella deep enough into grass to keep it standing.

Similar problems arise when friends and family want to enjoy a leisure or sporting event that requires the erection of a pole, such as volleyball, badminton, basketball, fishing, and the like.

Therefore, there is a need for a pole stand that can be used at a variety of places, such as the park or the beach, that is easy to set up, stable, and versatile enough to change the angle of the pole as desired.

SUMMARY

The present invention is directed to a pole stand that is easy to use, easy to transport, and easy to store. The pole stand comprises a base, a holder, and a plurality of stakes. When not in use, the holder and stakes can be attached to the base in an efficient and compact manner for storage purposes. The holder can be adjustable to allow the pole to be positioned at various angles.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
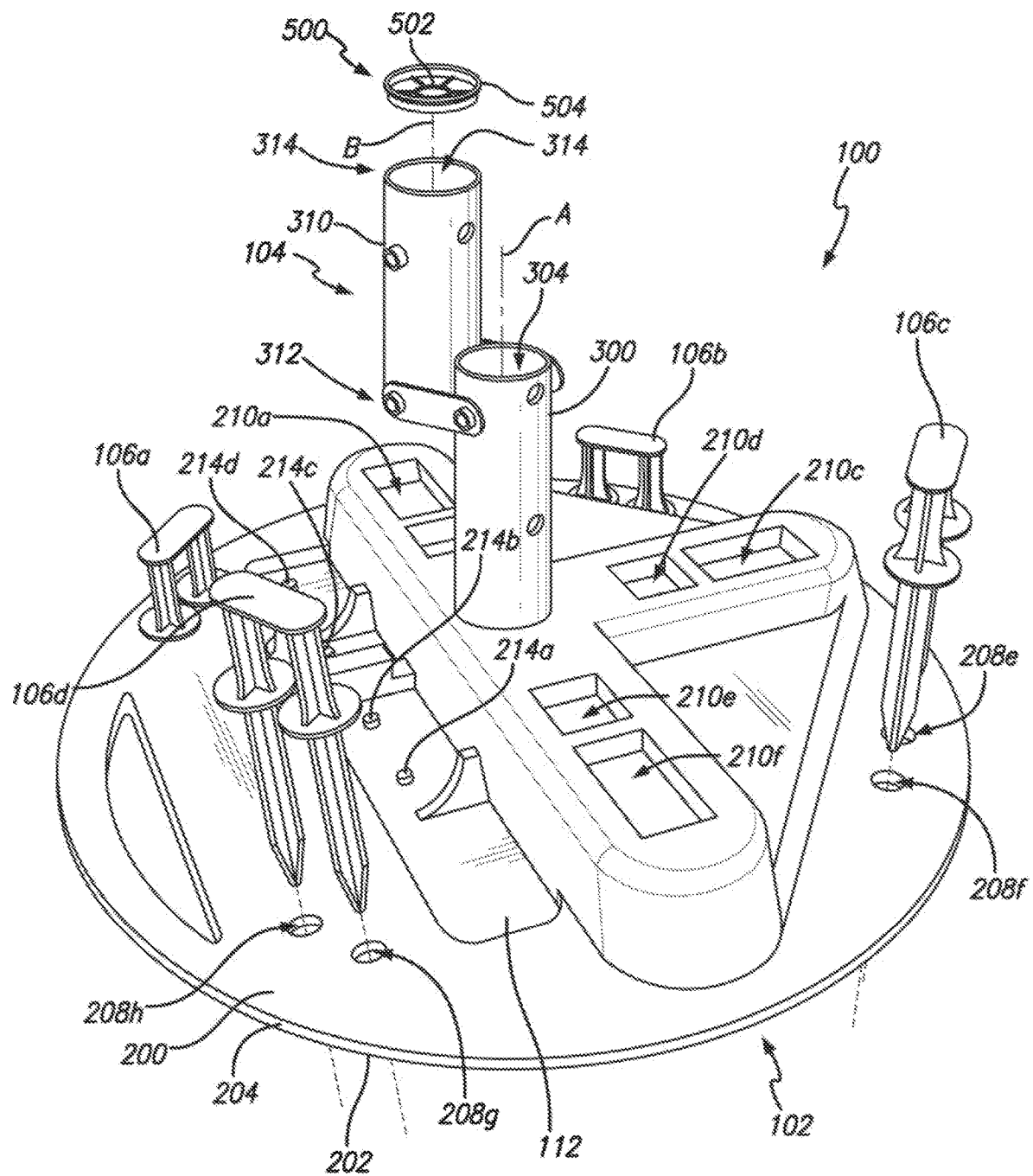
FIG. 1 shows a perspective top view of the present invention, with the two back stakes fully inserted into the holder, the two front stakes aligned to be inserted into the holder, and the insert aligned to be inserted into an opening of the cylindrical tube.
Figure 2:
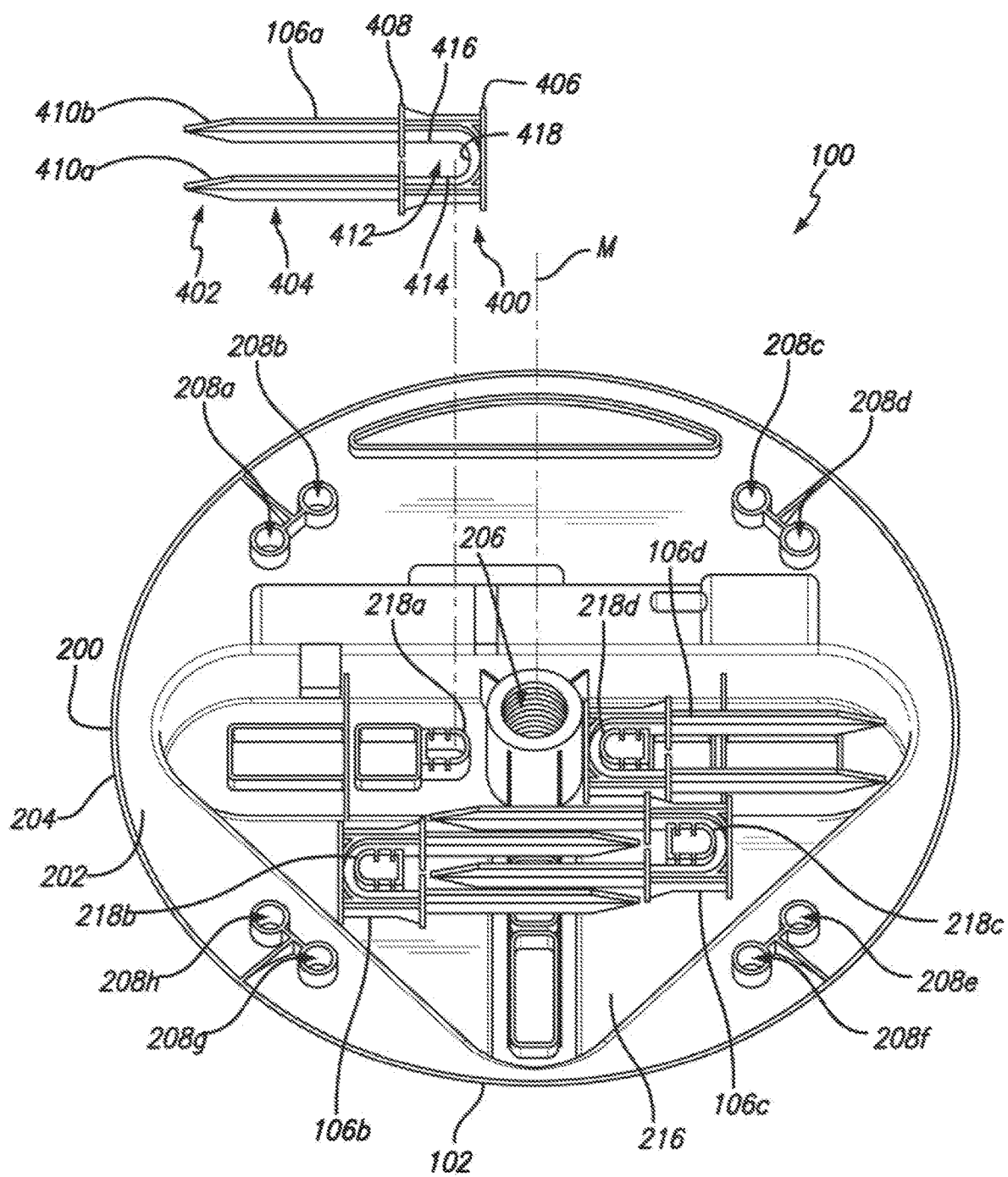
FIG. 2 shows a perspective bottom view of the present invention, with some of the stakes stowed away.
Figure 3:
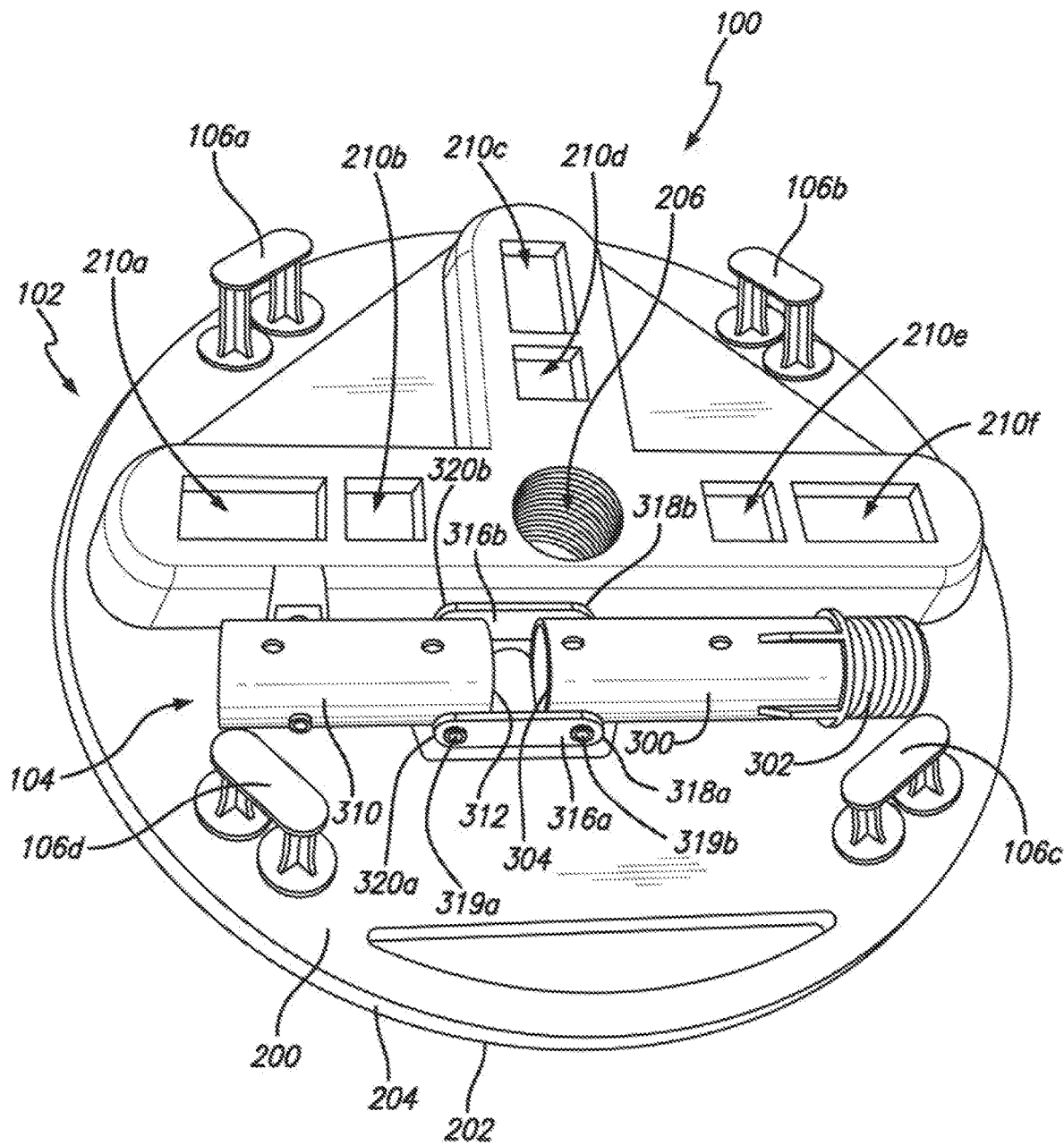
FIG. 3 shows a perspective top view of the present invention, with the holder stowed away.

The invention of the present application is a pole stand 100 for erecting poles, such as beach umbrellas, nets, fishing poles, and the like, that is easy to set up, easy to transport, and easy to store. As shown in FIGS. 1 through 3, the pole stand 100 comprises a base 102, a holder 104, and a plurality of stakes 106*a-d*. The base 102 provides the foundation to provide support for the pole. The holder 104 connects to the base 102 and holds the pole on the base 102 in various orientations. The plurality of stakes 106*a-d* adds additional securement for the base 102.

Figure 5:
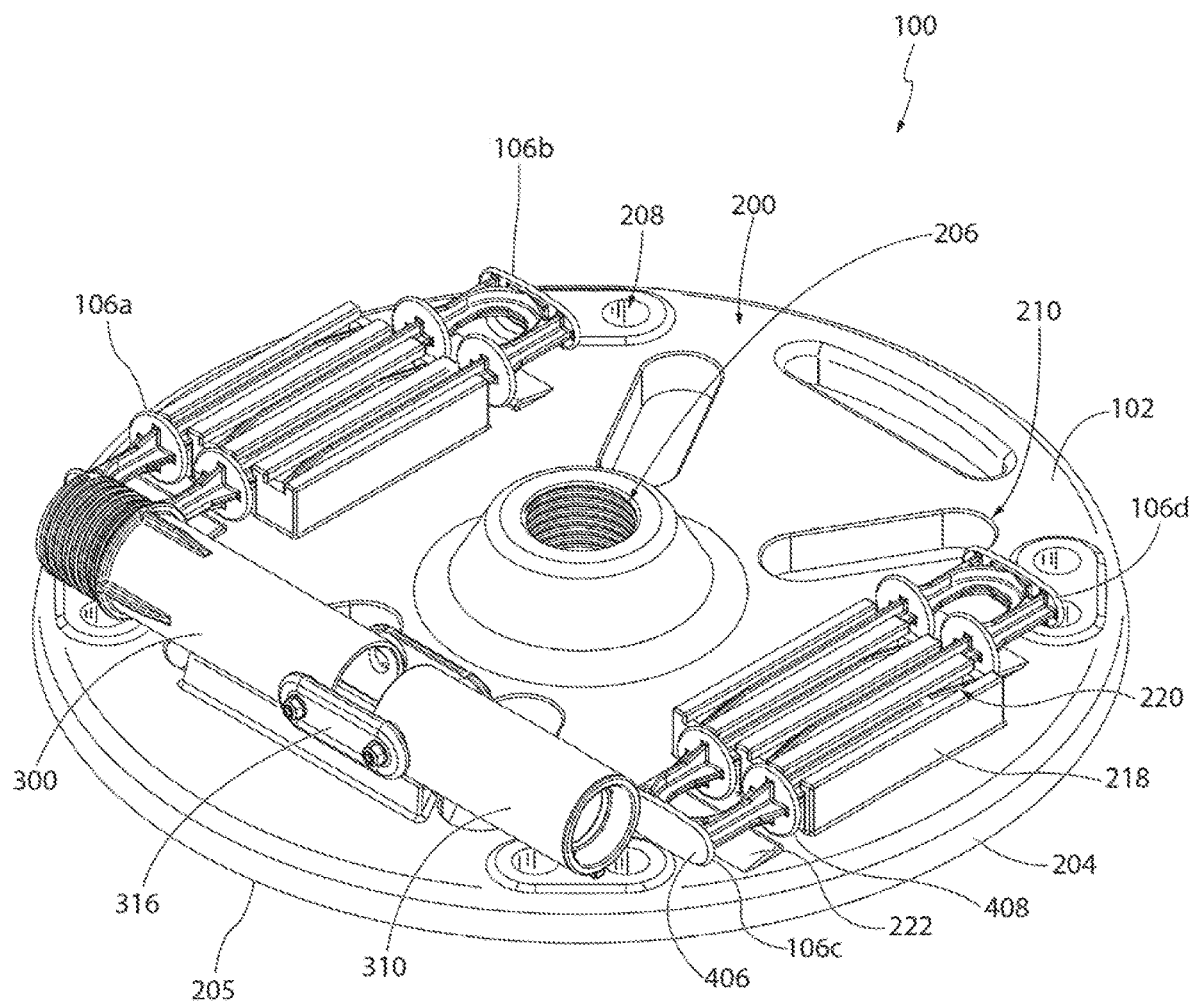
FIG. 5 shows a perspective view of another embodiment of the present invention.
Figure 6:
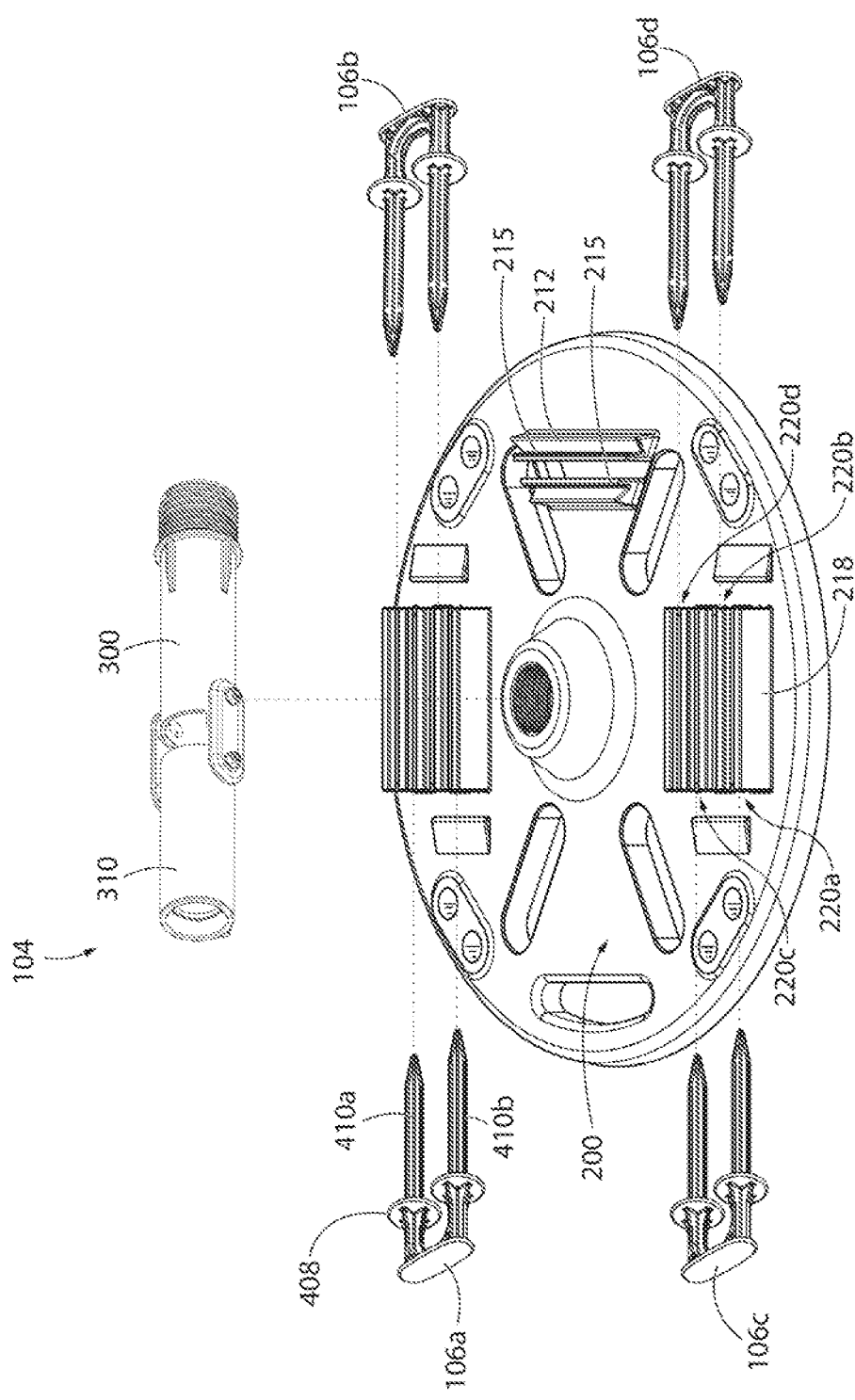
FIG. 6 shows an exploded view of the embodiment shown in FIG. 5.
Figure 7:
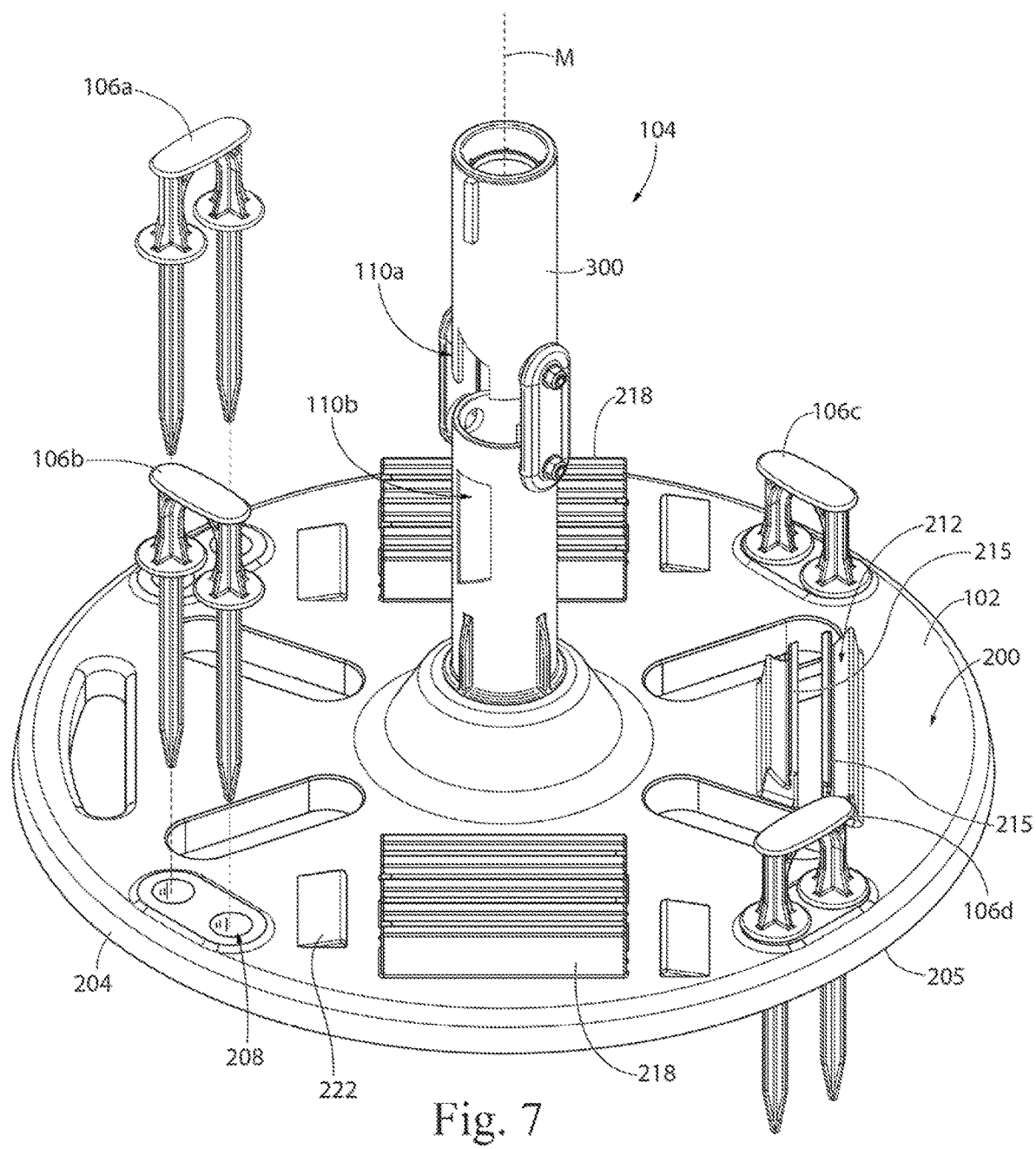
FIG. 7 shows a perspective view of the embodiment in FIG. 5 in use.

In the preferred embodiment, the base 102 is circular in shape having a top surface 200 and a bottom surface 202 opposite the top surface 200, and the top and bottom surfaces 200, 202 are bound by an outer perimeter 204. The base 102 comprises a main hole 206 at the center, a plurality of stake holes 208*a-h* along and adjacent to the outer perimeter 204 of the base 102, and a plurality of auxiliary holes 210*a-f* adjacent to the main hole 206. A main axis M passes through the center of the main hole 206, perpendicular to the top and bottom surfaces 200, 202. The main hole 206 may be threaded. The plurality of stake holes 208*a-h* may be intermittently and evenly spaced along and adjacent to the outer perimeter 204 of the base 102. The plurality of stakes 106*a-d* may be inserted into the plurality of stake holes 208*a-h* to secure the base 102 to the ground, such as in the grass or sand. The plurality of auxiliary holes 210*a-f* may be positioned adjacent to the main hole 206 for reasons discussed below. The top surface 200 further comprises a channel 212 with supports 215 protruding therefrom to secure the holder 104 when not in use. In some embodiments, the supports 215 can be a plurality of protruding pegs 214*a-d* as shown in FIG. 1. The plurality of protruding pegs 214*a-d* may be used to secure the holder 104 when not in use, as shown in FIG. 3. In some embodiments, the supports 215 can be rails used to secure the holder 104 when not in use, as shown in FIGS. 5-7. Other supports 215 can be used to secure the holder 104 in place on the base 102 when not in use, such as magnets, clips, hook and loop fasteners, interference fit, hooks, and the like. The holder 104 can be configured with opening 110*a*, 110*b*, to receive the supports 215 to secure the holder 104 in the stowed configuration on the base 102. The holder 104 may snap on, slide on, click on, squeeze on, and the like, to the support 215.

The bottom surface 202 comprises a recessed portion 216. The recessed portion 216 causes the top surface 200 to have an elevated portion to accommodate the recessed portion 216. Within the recessed portion 216 may be a plurality of stake holders 218*a-d*. The plurality of stake holders 218*a-d* may be used to secure the plurality of stakes 106*a-d* when not in use, as shown in FIG. 2. The plurality of stake holders 218*a-d* may be any type of fastener, such as a clip, hook, adhesive, strap, elastic band, resistance-fit protuberance, and the like. In the preferred embodiment, the plurality of stake holders 218*a-d* may be protuberances that project from the recessed portion 216. More preferably, the plurality of the stake holders 218*a-d* may be C-shaped protuberances. In the preferred embodiment, the plurality of the stake holders 218*a-d* that are C-shaped protuberances are designed to match C-shaped gaps 412 of the plurality of stakes 106*a-d* to secure the plurality of stakes by resistance fit or clips. The C-shaped gaps 412 are discussed below. More preferably, the plurality of stake holders 218a-d are strategically arranged within the recess to allow for efficient storage of the plurality of stakes 106a-d within the recess 216 as shown in FIG. 2.

Figure 8:
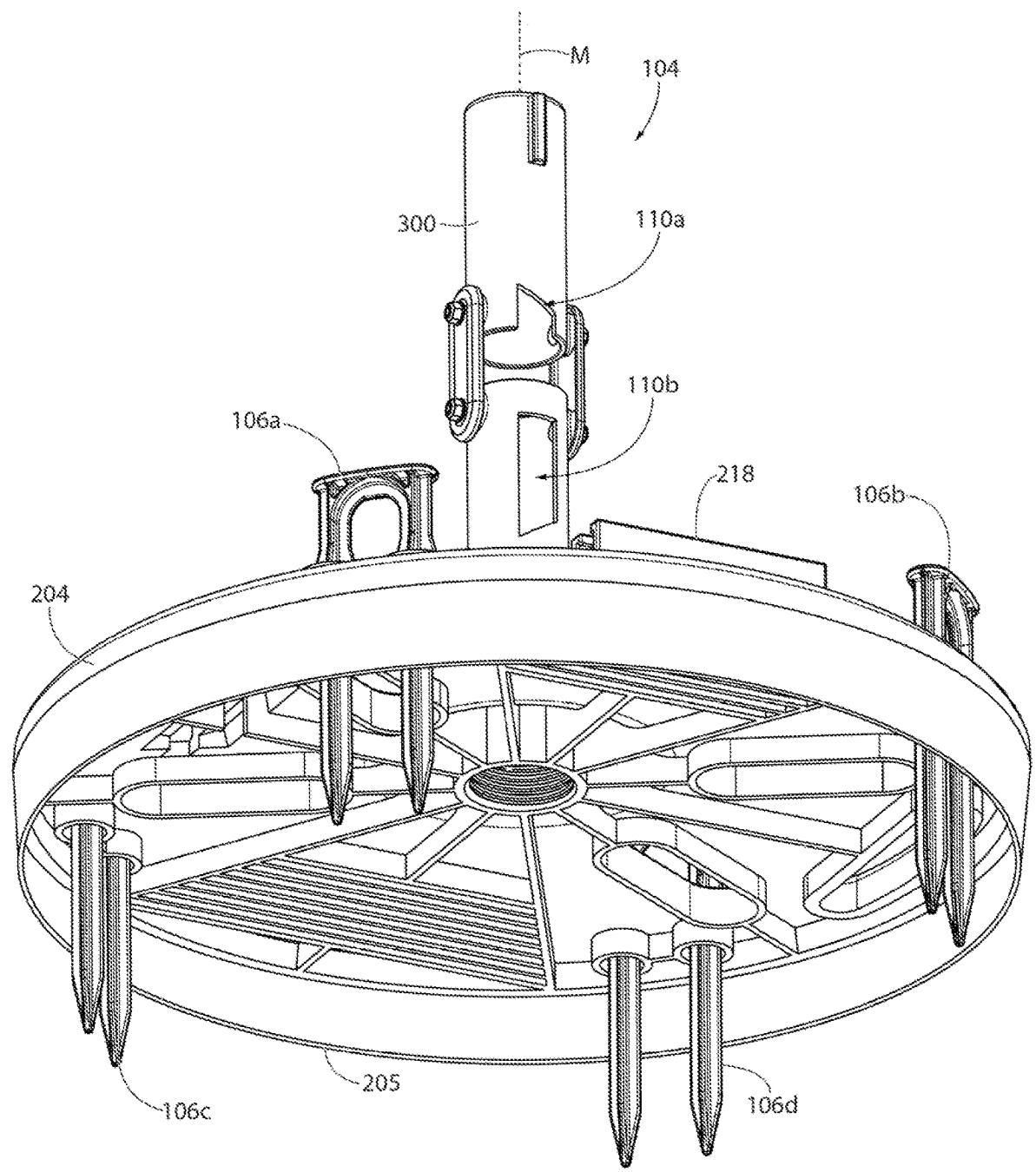
FIG. 8 shows a perspective view of the embodiment in FIG. 5 from the bottom.

In some embodiments, the outer perimeter 204 can have a descending edge 205 descending downwardly away from the top surface 200. As shown in FIG. 8, the descending edge 205 can descend past any structure on the bottom surface 202. As such, when the base 102 is placed on the ground with the bottom surface 202 towards the ground, the descending edge 205 contacts the ground elevating the bottom surface 202 above the ground. This configuration allows the descending edge 205 to be dug into the ground. For example, if the user stomps on the top surface 200 of the base, the descending edge 205 digs into the ground until the bottom surface 202 met the ground. The user could also rotate the base 200 clockwise and counterclockwise to dig the descending edge 205 into the ground. Digging the descending edge 205 into the ground enhances the stability of the base 102 when a pole is inserted into the holder 104. In some embodiments, the base 102 can comprise a plurality of descending edges 205 intermittently spaced apart. Creating gaps in between the descending edge 205 can facilitate digging the descending edge 205 into the ground. In some embodiments, the gap between descending edges 205 can be so great that the descending edges 205 essentially form spikes. As such, the descending edges 205 can terminate as sharp points. In some embodiments, the descending edge 205 can be deployable and stowable. For example, in the deployed configuration, the descending edge 205 projects downwardly, perpendicular to the base 102. In the stowed configuration, the descending edge 205 can be configured parallel to the base 102. As such, the descending edge 205 can be attached to the outer perimeter 204 by a joint. In some embodiments, in the stowed configuration, the descending edge 205 may be raised so as to reside in between the top surface 200 and the bottom surface 202 while maintaining a perpendicular orientation to the base 102.

The holder 104 comprises a main cylindrical tube 300 defining a first axis A. The main tube 300 has a proximal end 302, a distal end 304 opposite of the proximal end 302, and openings on both ends. In the preferred embodiment, the proximal end 302 may be threaded to screw into the main hole 206. A pole could be inserted into the holder 104 to support a pole in an upright configuration parallel to and coaxial with the main axis M.

Oftentimes the user would like to be able to adjust the angle of the pole as the sun moves. To permit the pole to be inserted at an angle, the holder 104 may comprise a secondary cylindrical tube 310 attached to the main tube 300. The secondary tube 310 defines a second axis B. The secondary tube 310 has a connectable end 312 and a free end 314. The secondary tube 310 may be movably connected to the main tube 300 via a pair of link arms 316a,b. Each link arm 316a,b has a first end 318a,b and a second end 320a,b. The first end 318a,b of each link arm is rotatably connected to the main tube 300 at its distal end 304. The second end 320a,b of each link arm 316a,b is rotatably connected to the connectable end 312 of the secondary tube 310. This rotatable linkage of the main tube 300 to the secondary tube 310 allows the secondary tube 310 to be adjusted relative to the main tube 300. In the preferred embodiment, the secondary tube 310 can be adjusted relative to the main tube 300 such that the second axis B can be coaxially aligned with the first axis A or positioned at any angle between 0 and 180 degrees, relative to the first axis A.

Each of the plurality of stakes 106a-d can be any kind of sturdy rod having a top 400, a bottom 402, and a middle portion 404 there between. In the preferred embodiment, each of the plurality of stakes 106a-d tapers into a sharp point at the bottom 402. The top 400 may have a flat head 406 so that the stake can be pounded into the ground. In the preferred embodiment, a stop 408 is positioned on the middle portion 404, closer to the top 400 than the bottom 402. The dimensions of each of the plurality of stakes 106a-d are such that it can be inserted into the stake holes 208a-h. The stop 408 prevents each of the plurality of stakes 106a-d from being inserted too deep into the stake holes 208a-h, which would make it difficult or inconvenient to pull out each of the plurality of stakes 106a-d. In the preferred embodiment, a pair of stake prongs 410a, 410b may be connected or formed together creating a pi-shaped, two-prong stake (π) 106a-d. In such an embodiment, the stake holes 208a,b; 208c,d; 208e,f; 208g,h are arranged in pairs so that each prong 410a, 410b of the two-prong stake embodiment can be inserted simultaneously into one of the pairs of stake holes 208a,b; 208c,d; 208e,f; 208g,h. Having two prongs, the stake heads 406 of each of the plurality of the two-prong stakes 106a-d increase in surface area, making it easier to pound each of the plurality of stakes 106a-d into the ground.

The two-prong stake embodiment also creates the C-shaped gap 412 mentioned above and is defined by the inner wall 414 of the first prong 410a, the bottom surface 418 of the head 406, and the inner wall 416 of the second prong 410b. This gap 412 is designed to be substantially similar to the C-shaped protuberance 218 on the bottom surface 202 of the base 102. This allows each of the plurality of two-prong stakes 106a-d to be secured to the protuberances 218 via resistance fit. In some embodiments, the protuberances 218 may each have a small lip to catch the stakes 106 in the C-shaped gap 412. The C-shaped protuberances 218 are strategically arranged so that the stakes 106 can be efficiently arranged within the recess 216 so as to minimize wasted space.

In some embodiments, the stake holders 218a-d are located on the top surface 200 of the base 102 as shown in FIGS. 5-8. In some embodiments, the stake holders 218a-d can comprise channels 220. The channels 220 are configured to receive the stakes 106a-d. For example, the channels 220 can be configured so that each prong 410a, 410b can be inserted into one of the channels 220. In the preferred embodiment, the channels 220 can be arranged for compact storage of the stakes 106a-d. For example, the stake holder 218 can comprise a series of four channels 220a-d aligned parallel and adjacent to each other. The channels 220a-d can be spaced apart such that the distance between every other channel is approximately the distance between the prongs 410a, 410b of a stake 106. As a result, the prongs 410a, 410b of a first stake 106a is inserted into the first channel 220a and the third channel 220c with second channel 220b in between the first channel 220a and the third channel 220c empty, and the fourth channel 220d left empty. This configuration allows a second stake 106b to be held by the second channel 220b and fourth channel 220d by inserted the prongs 410a, 410b of the second stake 106b into the second channel 220b and fourth channel 220d. In this configuration, the first prong 410a of a first stake 106a is in between the first and second prongs 410a, 410b of a second stake 106b, and the first prong 410a of a second stake 106b is in between the first and second prongs 410a, 410b of the first stake 106a as shown in FIGS. 5 and 6.

In some embodiments, a barrier 222 can protrude above the top surface 200 adjacent to the stake holders 218a-d. The barriers 222 can be configured to block the stakes 106a-d from inadvertently coming out of their respective channels 220a-d. In the preferred embodiment the barriers 222 are positioned to block the stops 408 on the stakes 106a-d. As such, when the stakes 106a-d are properly inserted into the stake holders 218, the barrier 222 resides in between the stop 408 and the stake head 406 as shown in FIG. 5.

In the preferred embodiment, the barrier 222 is configured in the form of a ramp with the ramp ascending towards the stake holder 218. As such, the stakes 106a-d can easily slide over the barrier 222 while being inserted into the stake holder 218, but once the stakes 106a-d are fully inserted to the point where the stop 408 has slid passed the barrier 222, it becomes difficult for the stakes 106a-d to slide out.

In some embodiments, the pole holder 104 may come with an insert 500 that can be inserted into the openings 304, 314 of the cylindrical tubes 300, 310. The insert 500 comprises a narrower hole 502 than the openings 304, 314 of the cylindrical tubes 300, 310 so that the holder 104 can be used with umbrellas with thinner poles 10. The insert 500 may be a disk-like cylinder. At one end may be a flanged lip 504 to prevent the insert 500 from being lodged too deep inside the cylindrical tubes 300, 310.

In use, the user places the base 102 on the ground, such as sand or grass. The stakes 106a-d are driven into the stake holes 208a-d to secure the base 102 to the ground. The holder 104 is screwed into the main hole 206 via the main tube 300. The main tube 300 may be aligned with the secondary cylindrical tube 310 so that their axes are coaxially aligned. A pole is then inserted into the secondary cylindrical tube 310 through the main cylindrical tube 300 and, optionally, through the main hole 206 into the ground. In this configuration the pole is perfectly upright, coaxially aligned with the cylindrical tubes 300, 310, and perpendicular to the base 102.

Figure 4:
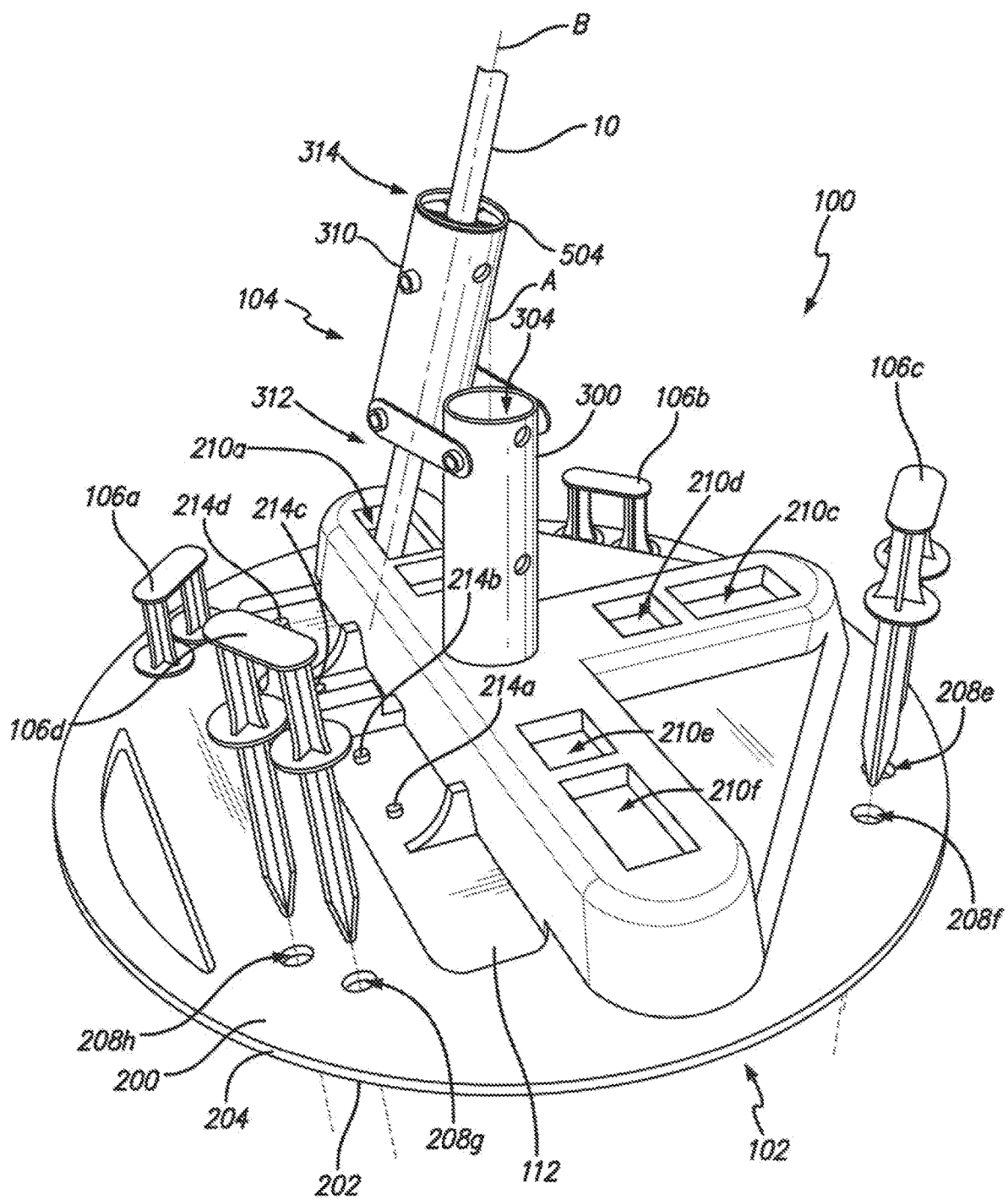
FIG. 4 shows a perspective view of the present invention in use with a pole inserted into the holder.

If the user wants the pole to be tilted, the user can pull the pole up so as to be removed from the main cylindrical tube 300 but still within the secondary cylindrical tube 310. The secondary tube 310 is then tilted by rotating the secondary cylindrical tube 310 about the pins 319a,b that secure the secondary cylindrical tubes 310 to the link arms 316a,b so that the second axis B is angled relative to the first axis A. The degree of the angle is up to the user. The user can then push the pole down and insert the pole 10 of the pole into one of the auxiliary holes 210a-f as shown in FIG. 4. This then secures the pole in an angled position.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

For example, although the application has been described in the context of an umbrella holder, the stand and holder can be used in many different applications in which a pole needs to be erected, such as with volleyball nets, badminton nets, fishing poles, basketball hoop, and the like.

What is claimed is:

1. A method of holding a pole, comprising:
   a) placing a pole stand on a ground, the pole stand comprising:
      i) a base defining a center and a main axis that passes through the center of the base and is perpendicular to the base, the base comprising a main hole at the center; a top surface having a channel formed in the top surface adjacent to the main hole, the channel having supports; a plurality of stake holders on the top surface; a bottom surface opposite the top surface, wherein the top and bottom surfaces are bound by an outer perimeter; and a plurality of stake holes in the base adjacent the outer perimeter;
      ii) a holder attachable to the base; and
      iii) a plurality of stakes that are removably connected to the base;
   b) removing a first stake of the plurality of stakes from a first stake holder of the plurality of stake holders by passing a stop on the first stake past a barrier on the base;
   c) inserting the first stake into the ground through a first stake hole of the plurality of stake holes;
   d) attaching the holder to the base at the main hole; and
   e) inserting a pole through the holder.

2. The method of claim 1, wherein the holder further comprises a main tube defining a first axis, the main tube comprising a proximal end, a distal end opposite the proximal end, and openings on both ends.

3. The method of claim 2, wherein the holder further comprises a secondary tube defining a second axis, the secondary tube comprising a connectable end, a free end opposite the connectable end, and openings on both the connectable and the free ends, wherein the connectable end of the secondary tube is movably attached to the distal end of the main tube via a pair of link arms, and wherein the link arms permit the secondary tube to be adjusted relative to the main tube such that the second axis can be coaxially aligned with the first axis or positioned at any angle between 0 and 180 degrees relative to the first axis.

4. The method of claim 3, further comprising the step of inserting the pole through the secondary tube, then through an auxiliary hole and into the ground.

5. The method of claim 1, when finished holding the pole, the method further comprising the steps of:
   a) removing the first stake from the ground;
   b) sliding two prongs of the first stake into two channels of the first stake holder; and
   c) sliding two prongs of a second stake of the plurality of stakes into different channels of the first stake holder, wherein a first prong of the first stake is in between a first prong and a second prong of the second stake, and the first prong of the second stake is in between the first prong and a second prong of the first stake.

6. The method of claim 5, wherein sliding the first stake into the first stake holder comprises passing the stop on the first stake past the barrier on the base.

7. The method of claim 6, wherein the barrier is ramped upwardly towards the first stake holder such that when the stop of the first stake is pushed past the barrier towards the first stake holder, the barrier blocks the stop and prevents the first stake from falling out from the first stake holder.

* * * * *